United States Patent
Mudretsov et al.

(10) Patent No.: US 11,257,223 B2
(45) Date of Patent: *Feb. 22, 2022

(54) SYSTEMS AND METHODS FOR USER DETECTION, IDENTIFICATION, AND LOCALIZATION WITHIN A DEFINED SPACE

(71) Applicant: Creavision Technologies, Ltd., Dartford (GB)

(72) Inventors: Victor Mudretsov, Wokingham (GB); Raimilson Carlos Medeiros, Winnipeg (CA); Dmitry Markuza, Winnipeg (CA); Sylvie Chih Wei Ong, Winnipeg (CA); Bin Zhou, Winnipeg (CA)

(73) Assignee: Creavision Technologies, Ltd., Dartford (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/943,736

(22) Filed: Jul. 30, 2020

(65) Prior Publication Data
US 2020/0357125 A1 Nov. 12, 2020

Related U.S. Application Data

(63) Continuation of application No. 15/984,970, filed on May 21, 2018, now Pat. No. 10,762,640.
(Continued)

(51) Int. Cl.
*G06T 7/246* (2017.01)
*G06K 9/00* (2006.01)
*H04N 5/232* (2006.01)

(52) U.S. Cl.
CPC .......... *G06T 7/246* (2017.01); *G06K 9/00221* (2013.01); *G06K 9/00268* (2013.01);
(Continued)

(58) Field of Classification Search
CPC ............... G06T 7/246; G06K 9/00348; G06K 9/00771; G06N 5/23219
See application file for complete search history.

(56) References Cited

U.S. PATENT DOCUMENTS

| | | | |
|---|---|---|---|
| 2013/0322720 A1* | 12/2013 | Hu | G06T 7/50 382/131 |
| 2016/0100790 A1* | 4/2016 | Cantu | A61B 5/0064 600/306 |
| 2017/0160813 A1* | 6/2017 | Divakaran | G10L 15/1815 |

OTHER PUBLICATIONS

Huber, et al., "Bio-inspired approach for intelligent Unattended Ground Sensors", Next Generation Robotics II; and Machine Intelligence and Bio-inspired Computation: Theory and Applications IX, Proc. of SPIE vol. 9494, 94940S 2015, 2015.
(Continued)

*Primary Examiner* — John J Lee
(74) *Attorney, Agent, or Firm* — Padowithz Alce; Alce PLLC

(57) ABSTRACT

A system and method includes detecting motion in a space; capturing images of a scene in a direction of the motion within the space by peripheral image capturing devices and detecting a body of a person within the images of the scene; extracting an image of the body from the images of the scene; identifying a head of the body based on the extracted at least one image of the body and extracting an image of a head from the extracted the one image of the body; transmitting the one image of the body to a body tracking module; transmitting the extracted image of the head to a face detection module; in parallel, tracking the body within the space and performing by a facial recognition module facial recognition of the extracted image of the head of the body; and determining an identity of a user associated with the body.

20 Claims, 4 Drawing Sheets

Related U.S. Application Data

(60) Provisional application No. 62/509,624, filed on May 22, 2017.

(52) U.S. Cl.
CPC ..... *G06K 9/00288* (2013.01); *G06K 9/00348* (2013.01); *G06K 9/00362* (2013.01); *G06K 9/00771* (2013.01); *H04N 5/23219* (2013.01); *G06T 2207/10016* (2013.01); *G06T 2207/30201* (2013.01); *G06T 2207/30241* (2013.01)

(56) References Cited

OTHER PUBLICATIONS

International Search Report and the Written Opinion of the International Searching Authority, Application No. PCT/IB2018/0300601, filed Sep. 3, 2018, Sep. 3, 2018.
Bernardin, Keni , et al., "Audio-Visual Multi-Person Tracking and Indentification for Smart Environments", MM, Sep. 23, 2007, 661-670.

* cited by examiner

SYSTEMS AND METHODS FOR USER DETECTION, IDENTIFICATION, AND LOCALIZATION WITHIN A DEFINED SPACE

CROSS-REFERENCE TO RELATED APPLICATIONS

This application is a continuation of U.S. patent application Ser. No. 15/984,970, filed 21 May 2018, which claims the benefit of U.S. Provisional Application No. 62/509,624 filed 22 May 2017, all of which are incorporated in their entirety by this reference.

TECHNICAL FIELD

The inventions of the present application relate generally to the assistive automation technologies, and more specifically to new and useful computer vision systems and techniques for processing visual data by an assistive automation device.

BACKGROUND

Many advances are being made in assistive automation technologies. Many of these advances involve artificially intelligent interactive devices which enable a user to communicate with the interactive devices to provide instructions for automating several home processes and/or otherwise, for placing general inquiries and the like. While these existing home automation systems and automated virtual assistant systems typically include an interface allowing a user to audibly and/or physically interact with the system, these existing systems lack robust imaging components that allow for an efficient and accurate identification and tracking of a user within a space and additionally, localization of the user in the space.

Thus, there is a need in the assistive automation device field to create new and useful systems and methods for visually interfacing with a user by implementing novel computer vision techniques. The embodiments of the present application provide such new and useful systems and methods.

BRIEF SUMMARY OF THE INVENTION(S)

Thus, there is a need in the assistive automation device field to create new and useful systems and methods for visually interfacing with a user by implementing novel computer vision techniques. The embodiments of the present application provide such new and useful systems and methods.

Embodiments of the present application include systems and method for intelligent user detection, localization, and/or identification that includes a plurality of peripheral image capturing devices arranged about a body of the system, wherein the plurality of peripheral image capturing device capture one or more images of a scene within a space; a database storing biometric image data of one or more users; a body extraction module that extracts at least one image of the body from the one or more images of the scene, wherein the body extraction module further extracts an image of a head from the extracted at least one image of the body; a body tracking module that tracks the body within the space based on the extracted at least one image of the body; a facial recognition module that performs facial recognition of the extracted image of the head of the body in parallel with the body tracking module; a processing circuit that: determines an identity of a user associated with the body based on results of the facial recognition module; in response to determining the identity of the user, augments the image frames of the captured one or more images that include the body with identity data based on the determined identity of the user.

In one embodiment, the systems and methods include one or more movement detection sensors that detect motion and trigger an operation of the plurality of peripheral image capturing devices.

In one embodiment, the systems and methods include a high-resolution camera that captures images of the scene at a higher image resolution than the plurality of peripheral cameras, wherein the high-resolution camera is triggered to operate when an image quality of the one or more images captured by the plurality of peripheral cameras is below a facial recognition threshold.

In one embodiment, tracking the body includes: augmenting each of the image frames of the captured one or more images that include the body with tracking data, wherein the tracking data comprises coordinate data of a position of the body within the space; and predicting a movement of the body within the space based on the image frames having tracking data.

Further embodiments of the present application provide systems and methods that include automatically tracking a user within a space and determining an identity of the user based on image data that includes automatically detecting, by a motion sensor, motion in a space; in response to detecting the motion in the space, capturing one or more images of a scene in a direction of the motion within the space by one or more of a plurality of peripheral image capturing devices and detecting a body of a person within at least one of the one or more images of the scene; extracting at least one image of the body from the one or more images of the scene; identifying a head of the body based on the extracted at least one image of the body and extracting an image of a head from the extracted at least one image of the body; transmitting the extracted at least one image of the body to a body tracking module; transmitting the extracted image of the head to a face detection module; in parallel, (i) tracking the body within the space based on the extracted at least one image of the body and (ii) performing by a facial recognition module facial recognition of the extracted image of the head of the body based on the extracted image of the head; determining an identity of a user associated with the body based on results of the facial recognition module; and in response to determining the identity of the user, augmenting image frames of the captured one or more images that include the body within the scene with identity data based on the determined identity of the user.

In one embodiment, the systems and methods include identifying an image resolution of the extracted image of the head of the body; determining that the image resolution of the extracted image of the head of the body does not satisfy a minimal facial recognition threshold; in response to determining that the image resolution does not satisfy the minimal facial recognition threshold, providing an activation signal to a high-resolution image capturing device distinct from the plurality of peripheral cameras; and capturing by the high-resolution image capturing device one or more high-resolution images of a scene within the space.

In one embodiment, the minimal facial recognition threshold comprises a minimal image resolution required to successfully perform facial recognition of a user based on image data of a head, and the high-resolution image capturing device comprises an image capturing device that captures images that satisfy the minimal facial recognition threshold.

In one embodiment, the systems and methods include identifying the body of the person within the one or more high-resolution images of the scene; extracting at least one high-resolution image of the body from the one or more high-resolution images; extracting a high-resolution image of a head of the body from the at least one high-resolution image of the body; transmitting to the facial recognition module the extracted high-resolution image of the head of the body, wherein determining the identity of the user associated with the body is based on results of the facial recognition using the extracted high-resolution image of the head of the body.

In one embodiment, the systems and methods include augmenting each of the image frames of the captured one or more images that include the body with tracking data, wherein the tracking data comprises coordinate data of a position of the body within the space; and predicting a movement of the body within the space based on the image frames having tracking data.

In one embodiment, the prediction of the movement of the body comprises a predicted trajectory that identifies a plurality of future coordinate locations of the body within the space.

In one embodiment, the systems and methods include selectively activating a subset of the plurality of peripheral image capturing devices having a field-of-view in one or more areas within the space based on the predicted trajectory of the body.

In one embodiment, the systems and methods include augmenting tracking data, by the body tracking module, to each of the image frames that includes an image of the body, wherein the tracking data comprises coordinate data comprising X-axis coordinate data and Y-axis coordinate data of the body based on an X-Y coordinate system defined for the space, wherein the X-Y coordinate system is based on a position of the plurality of the peripheral image capturing devices functioning as a point of origin of the X-Y coordinate system in the space.

In one embodiment, the systems and methods include providing the one or more captured images as input into an object detection module; using the object detection module to detect one or more objects having an image of a body and/or an image of a face included in the one or more objects; flagging the one or more detected objects as objects that include data capable of triggering a false positive identification of a body or a user; and providing data relating to the one or more detected objects as input into a body detection module.

In one embodiment, the high-resolution image capturing device comprises a movable image capturing device that is movable relative to stationary positions of the plurality of peripheral image capturing devices, and the high-resolution image capturing device includes a greater focal length than a focal length of each of the plurality of peripheral cameras.

In one embodiment, the systems and methods include calculating a speed of movement of a body in a plurality of images of the body captured by the plurality of peripheral cameras, wherein if the speed of movement of the body does not satisfy a movement threshold, providing actual coordinate data of the body as input for generating movement instructions for the high-resolution image capturing device; and generating movement instructions for the high-resolution image capturing device based on the actual coordinate data of the body.

In one embodiment, the systems and methods include calculating a speed of movement of a body in a plurality of images of the body captured by the plurality of peripheral cameras, wherein if the speed of movement of the body satisfies a movement threshold, providing predicted coordinate data of the body as input for generating movement instructions for the high-resolution image capturing device; and generating movement instructions for the high-resolution image capturing device based on the actual coordinate data of the body.

In one embodiment, the systems and methods include augmenting the one or more images with an ephemeral identifier for the body recognized in the one or more images; and in response to determining the identity of the user associated with the body, replacing the ephemeral identifier with the identity of the user.

In one embodiment, the systems and methods include providing the one or more images of the scene as input into a gait recognition module; using the gait recognition module to determine the identity of the user based on gait data derived from the one or more images; and using the gait data to validate the identity of the user generated by the facial recognition module.

In one embodiment, the systems and methods include providing the one or more images of the scene as input into a body joint recognition module; using the body joint recognition module to determine the identity of the user based on body joint data derived from the one or more images; and using the body joint data to validate the identity of the user generated by the facial recognition module.

Embodiments of the present application include a method and a system for automatically detecting, by a presence sensor, a presence of a human body in a space; in response to detecting the presence of the human body in the space, capturing one or more images of a scene in a direction of the presence within the space by one or more of a plurality of peripheral image capturing devices and detecting a body of a person within at least one of the one or more images of the scene; extracting at least one image of the body from the one or more images of the scene; identifying a head of the body based on the extracted at least one image of the body and extracting an image of a head from the extracted at least one image of the body; transmitting a first image file comprising the extracted at least one image of the body to a body tracking module; transmitting a second image file comprising the extracted image of the head to a face detection module; in parallel, (i) tracking the body within the space based on the extracted at least one image of the body and (ii) performing by a biometric recognition module biometric recognition of the extracted image of the head of the body based on the extracted image of the head; determining an identity of a user associated with the body based on results of the biometric recognition module; and in response, augmenting image frames of the captured one or more images that include the body within the scene with identity data based on the determined identity of the user.

DESCRIPTION OF THE PREFERRED EMBODIMENTS

The following description of preferred embodiments of the present application are not intended to limit the inventions to these preferred embodiments, but rather to enable any person skilled in the art of to make and use these inventions.

1. System for Automatically Identifying a User

Figure 1:
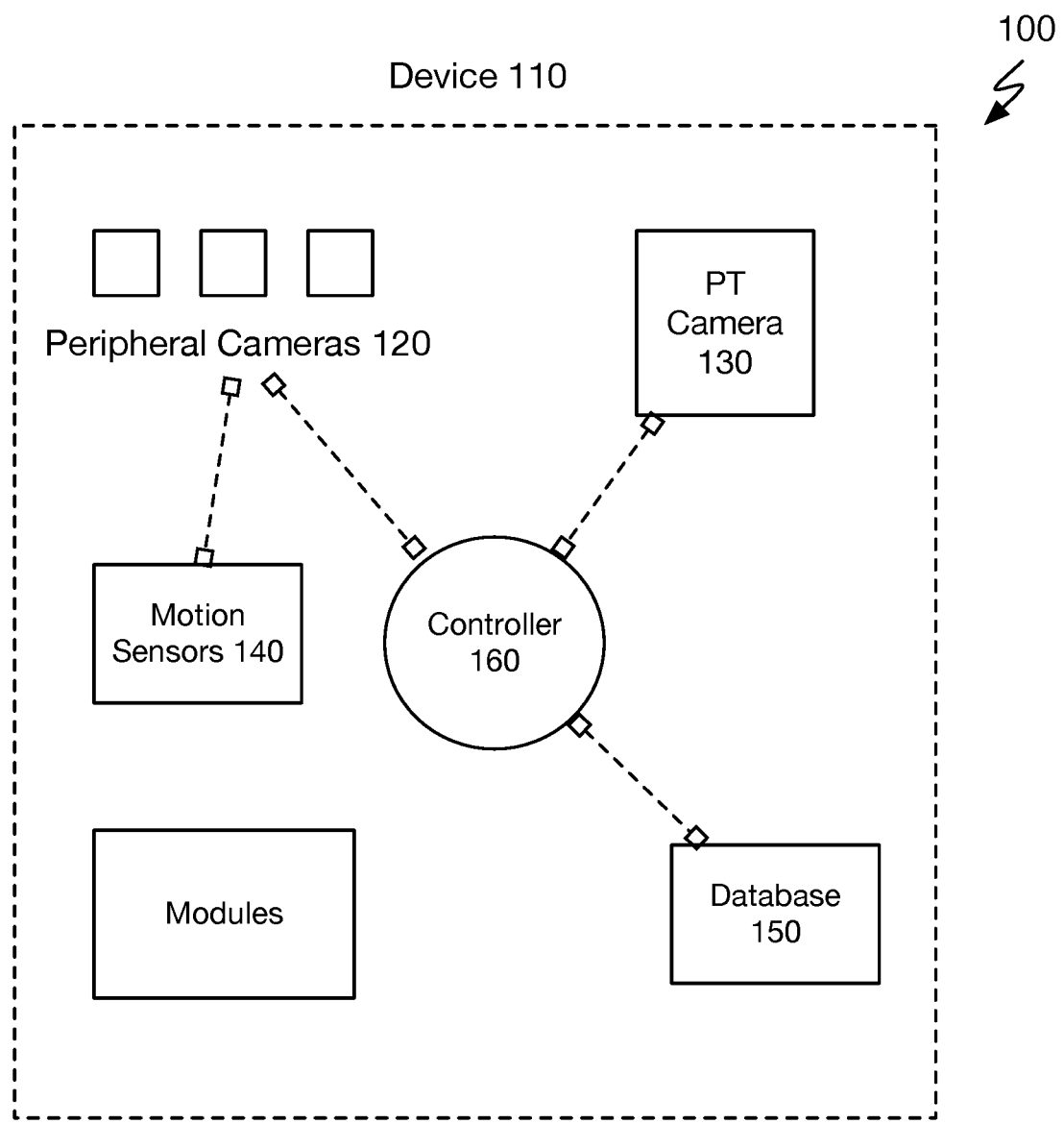
FIG. 1 illustrates a system in accordance with one or more embodiments of the present application.

As shown in FIG. 1, the system 100 includes a device 110 having a plurality of peripheral cameras (image capturing devices) 120, a pan/tilt and zoom (PTZ) camera 130, one or more movement detection sensors 140, a database 150, and controller 160.

The system 100 functions to implement a novel computer technique to detect a user in a space and further identify the user. In particular, using the one or more movement detection sensors 140, the system 100 functions to detect when a user has entered a space or generally, when any motion has occurred in a space surrounding the system 100. Any movement detected by the one or more movement detection sensors 140 would serve as an event trigger that causes an operation of the plurality of peripheral cameras 120 of the system 100. In some embodiments, when system 100 is idle, only the one or more movement detectors 140 may be operable to detect motion while the remaining components of the system 100 remain dormant. Because the system 100, in some embodiments, may be operable via a constrained device or the like (e.g., limited memory, limited computing power, and limited energy supply, etc.), it provides additional benefits to conserve device resources when there is no or limited activity to detect by the system 100. It shall be noted that in an idle state of the system 100 any of the one or more energy-consuming components or resources may be made idle or maintained in an active state.

When the plurality of peripheral cameras 120 are triggered to operate and capture image data, the system 100 functions to capture images of one or more bodies in the viewable areas of at least some of the peripheral cameras 130. The image data captured by the plurality of peripheral cameras 120 may then be used as input into several image processing modules of the system 100. Each of the processing modules described herein may be implemented by computer processing circuitry, computer processor unit, microcomputer, microcontroller, or the like. Additionally, or alternatively, some or all of the processes of the processing modules of the system 100 may be implemented via a distributed network of servers or computers (e.g., cloud computing).

The processing modules may implement one or more body detection, face detection, body tracking, and various predictive algorithms. In some instances, the process detection algorithms seek to identify a body and a face from the image data. In the circumstance that the processing images are not capable or confidently capable of identifying a face in the image data, this may trigger an operating signal or command to the PT camera 130 in order to capture a face in an image scene that is suitable for facial recognition processing.

Thus, the system 100 functions to accurately provide facial images that can be used to accurately and efficiently identify a user and contemporaneously or simultaneously, provide body image data to track movements of a user. Once a user's identity is determined at the facial recognition processes, the user identity information may be added to the body tracking information to inform the system regarding an identity of the body being tracked. Once the user ID and body information are in association, the system 100 may be more capable of meaningfully interacting with the user based on specific patterns and preferences of the user.

The plurality of peripheral cameras 120 may include a plurality of RGB cameras that are circumferentially positioned (either interior surface or exterior surface) about the system 100. In some embodiments, the plurality of peripheral cameras 120 are fixed in their arrangement with respect to the system 100. The system 100 may employ any type of image sensor (e.g., scanners, and the like), image capture system, or the like that is capable of acquiring image data from circumstances surrounding the system 100.

The PT camera 130 may include a camera that is moveable about multiple axes (e.g., X, Y) and able to zoom along a Z-axis or the like. The PT camera 130 may be used in combination with the plurality of peripheral cameras 120 to identity one or more features of a body that is detected by the system 100. Relative to the peripheral cameras 120, the PT camera 130 may have a greater focal length allowing the PT camera to capture images that would typically outside of an accurate imaging range of the plurality of peripheral cameras 120. In one example, the PT camera 130 may be used to capture images of a face of a body where the plurality of peripheral cameras could not accurately provide such image. Accordingly, the PT camera 130 may be an image capturing device capable of capturing image data with a higher image resolution that is greater than a lower image resolution of the plurality of peripheral cameras 120.

In another example, the plurality of peripheral cameras 120 or another sensor (e.g., a depth sensor) may detect that a body image or the like is outside of the facial recognition zone (e.g., beyond a facial recognition threshold based on a radius or distance from the system 100 or the like) of the plurality of peripheral cameras 120. In this regard, when such detection is made, the system 100 may automatically generate a signal to trigger an operation of the PT camera 130 to begin capturing body images. Thus, in such embodiments, the triggering of the PT camera 130 may be based on distance thresholds and upon detecting that an observable object or body exceeds that threshold, this may cause the operation of the PT camera 130 to actuate a zoom function or an increased resolution function to capture better quality image data than would otherwise be obtainable by the plurality of peripheral cameras 120.

The database 150 may be a database storing image data of known users and/or known objects. The image data may include facial images, body images (partial or full), facial feature images (or data), object images (e.g., common objects or standard objects, etc.) and any suitable data that may be used to identify a known user and/or identify objects in an image scene. Thus, the database 150 may also include voice data and other biometric data of known users. Additionally, the database 150 may be implemented locally on the system 100 to improve security of the image data and user data captured and/or stored within database 150. However, in some embodiments, it is possible to offload some of the storage requirements of the system 100 to a remote storage system (e.g., the cloud).

The controller 160 preferably includes a microcontroller that includes a processing circuit (e.g., a CPU, a GPU, an ASIC, or any suitable integrated circuit), memory, one or more communication interfaces, a clock generator, and peripherals, such as timers, counters, PWM generators. The controller 160 functions to control each of the plurality of peripheral cameras 120, the PT camera 130, as well as the processing modules for processing image data captured by the system 100 according to one or more of the methods and/or processes described herein.

2. Method for Automatically Identifying a User

Figure 2:
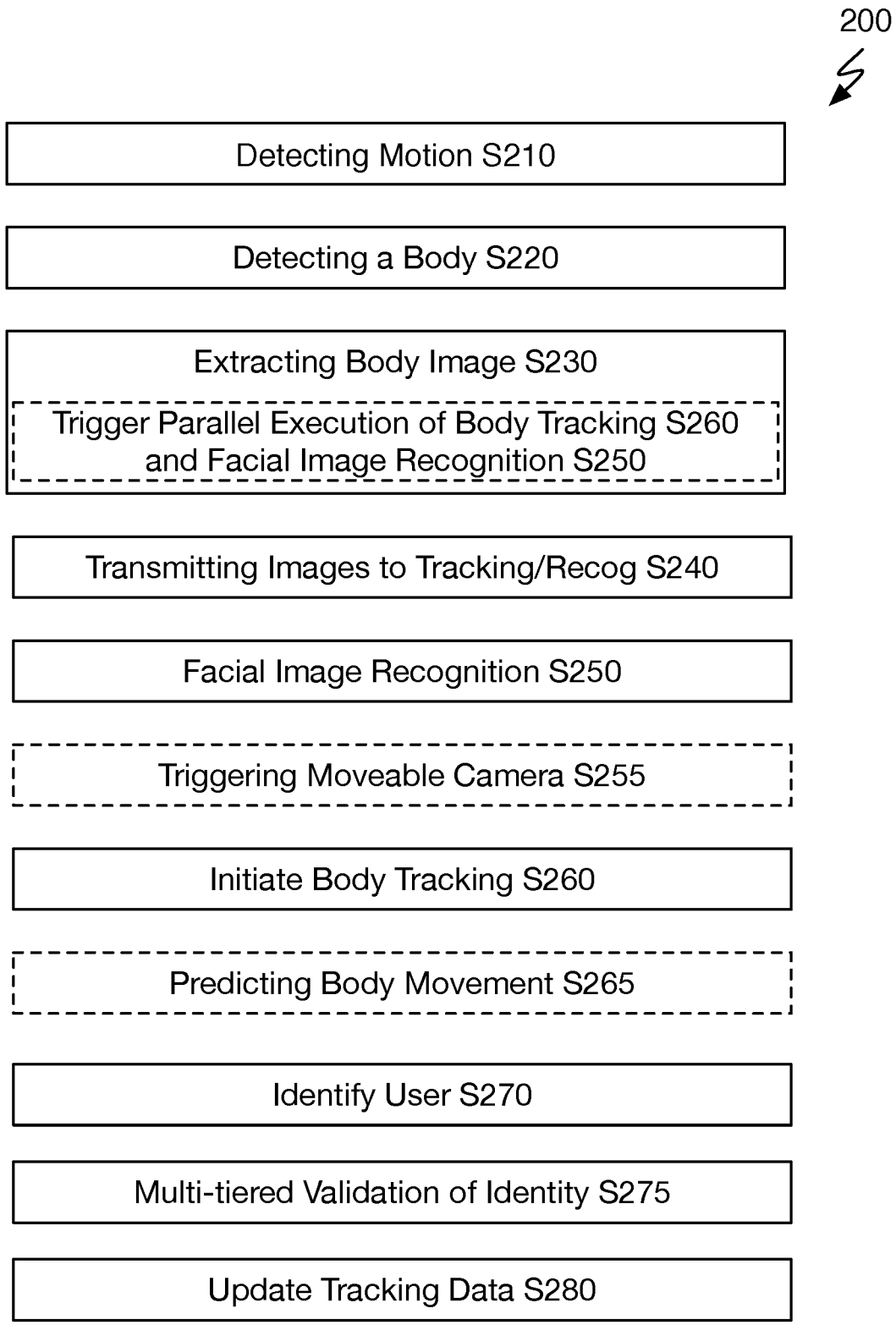
FIG. 2 illustrates a method in accordance with one or more embodiments of the present application.

As shown in FIG. 2, a method 200 includes automatically detecting motion in a defined space S210, capturing with peripheral cameras one or more images of a scene and detecting a body of a person in the scene S220, cropping an image of the detected body S230, transmitting the cropped image of the body to a body tracking module and to a face detection module S240, extracting or cropping an image of a head (including a face) of the body S250, initiating body tracking and augmentation of body tracking data to body image S260, identifying an identity of a user using the face of the body S270, and updating the tracking data with the identity of the user S280. Optionally, the method 200 includes predicting a movement of the body within the scene S265, and automatically triggering a second moveable camera to capture an image of a face of the body S255.

The method 200 preferably functions to implement a user detection, localization, and identification using at least a first camera or set of cameras and preferably, using at least a second camera that is operated in one or more circumstances or in predetermined circumstances. In particular, the method 200 employs a first set of cameras (image capturing devices) to identify, at least, a body of a user and potentially, a face of the user in a set of captured images. The second camera may be activated in the circumstance that the first camera is not able to accurately capture a face of the user for facial recognition processing or alternatively, a request is made to a system implementing the method 200 to capture an image of a user with greater accuracy that a previously captured image. That is, in the case, that the image resolution of the captured images of the body of the person or user does not include images having sufficient resolution to detect a face of the user and/or determine an identity of the user, then an activation signal may be transmitted to a second camera that is distinct from the first camera or first set of cameras for capturing an image of the body in an image resolution that is higher than an image resolution of the first camera or first set of cameras.

In some embodiments, when provided the set of captured images, the method 200 functions to track the body through all image frames and may additionally, and/or alternatively, predict a movement of the body or a trajectory of the body within the space. Preferably, the method 200 functions to provide a facial recognition for the associated body in parallel with the body tracking. Resultantly, method 200 is able to assign tracking data to the body and also, a user identity once facial recognition processing is successfully completed. Contemporaneously, the method 200 may function to localize the body within a space. The method 200 may additionally function to augment localization data to image frames that include the tracked and/or identified body.

S210, which includes automatically detecting motion in a defined space, functions to implement one or more sensors capable of detecting motion or a presence (e.g., presence detectors) of a body within a defined space. Accordingly, in some alternative implementations, the presence detectors may include thermal detectors, acoustic detectors, LIDAR, or any suitable short-range or long-range detectors and the like that may function to detect the presence of a user. The defined space may be defined based on one or more viewable areas of one or more cameras (or any type of suitable sensors). Accordingly, the defined space may be determined according to a field-of-view of the first set of cameras (e.g., the plurality of peripheral cameras) and/or the second camera (e.g., the high-resolution camera). The defined space may be any suitable space in which one or more users or bodies of users may typically be detected by one or more components of a system implementing the method 200 or any other suitable processes described herein. Accordingly, the defined space may be any area including small spaces or large spaces including structured rooms, unstructured spaces (e.g., spaces without walls), and the like. For instance, the system 100 may be implemented in a small space, such as a room (e.g., a living room) or a large space, such as an airport.

The one or more sensors implemented by S210 may preferably be microwave detectors. The microwave detectors may function to transmit waves within the defined space and based on a movement of any object or user within the defined space, the microwave detection is configured to receive a reflection amount of the waves and process a detection. It shall be noted that the one or more sensors may be any type of sensors including, but not limited to, optical, acoustic, passive infrared, ultrasonic, video cameras, gesture detectors, tomographic motion detector, as well as varying types of microwave detectors (e.g., radars and the like).

S210, upon detecting motion in the defined space, also functions to send a signal to a plurality of peripheral cameras. The signal to the plurality of peripheral cameras may indicate motion and thus, the signal functions initiate or trigger an operation of the peripheral cameras. Additionally, or alternatively, upon detection of motion in the space, S210 may also initiate or trigger the operation of a plurality processes including body tracking and movement prediction, as well as facial recognition processes.

Preferably, the signal to the plurality of peripheral cameras includes a direction of the motion and/or a zone with the defined space in which the motion was detected. For instance, the one or more sensors may detect motion in northern section of a room, but not in a southern section of the room. In such case, the motion detector may provide a signal indicating that motion was detected and also, data that identifies that the motion was detected in the northern section of the room. S210 may function to use the motion data including the motion direction or motion zone (section) or the like to selectively activate a subset of the plurality of peripheral cameras. In a preferred embodiment, the plurality of peripheral cameras may be arranged about a central body of a system implementing the method 200. In such case, not all of the peripheral cameras are required to capture images when only a portion of the defined space includes activity of a user or the like. Accordingly, S210 may selectively activate only the subset of peripheral cameras that has a field-of-view of the activity based on the motion direction or section data. S210 may additionally, and/or alternatively, activate within the subset one or more peripheral cameras into which motion of a body of the user is predicted to enter a field-of-view. That is, while the motion may be detected in a first area or section, the method 200 may predict motion to another area or section and correspondingly, selectively activate, in advance, one or more peripheral cameras with fields-of-view within the predicted areas of motion.

Additionally, S210 may function to use the motion data to verify in one or more outputs of the recognition modules and body tracking modules described herein (including a movement prediction module). Accordingly, the motion data may be used to validate (or invalidate) or confirm outputs of one or more modules described herein including validating a presence of human body, verifying a (predicted or estimated)

direction of motion of the body, verifying a position (e.g., sitting, standing, lying down) of a body with respect to one or more objects within a space or the like.

S220, which includes capturing with one or more of the plurality of peripheral cameras one or more images of a scene and detecting a body of a user in the images of the scene, functions to implement an operation of at least one of a plurality of peripheral cameras for capturing images of a scene indicated as having motion by the motion or presence detectors in S210. Additionally, or alternatively, S220 may function to continuously implement the plurality of peripheral cameras even absent a specific motion or presence signals from a sensor source (e.g., sensors of S210). Depending on a location of the detected motion, only a selected number of the plurality of peripheral cameras may be activated, in some embodiments. In particular, it may be preferable that a subset of cameras having a viewable range within the detected motion area are activated to capture images. In this way, a power consumption of a system implemented method 200 may be reduced.

As described in some detail above, in one variation, once a motion detection area is identified by the motion sensors, the additional peripheral cameras that do not have a viewable area in the motion detection area may only be activated to capture images based on a prediction of a movement of an object or body within scenes captured by the activated peripheral cameras. Thus, ahead of a user entering a space, the method 200 may function to predict that the user will enter that space and based on this prediction, selective peripheral cameras with a viewable area in that space that the user will be entering may be activated in advance of the user actually entering that space. Of course, if motion is detected at another area in the defined space by the motion detectors, this additional detection would function to activate any peripheral cameras having a viewable area that includes the areas in which new motion is detected.

Additionally, S220 may additionally function to transmit the captured images of the scene to a body detection module preferably implementing a body detection algorithm. The body detection module receiving the captured images may function to detect whether a body of a person or the like exists in some or all of the plurality of captured images. The body detection algorithm may include a machine learning model with human body edge detection capabilities or any suitable body detection process or algorithm for identifying one or more bodies within a scene. It shall be noted that an object detection module implementing an object detection algorithm may similarly be implemented, which may, in turn, assist body detection by detecting non-body objects and correspondingly, enabling the method 200 to eliminate false positives of a body within a scene. For instance, in some embodiments, objects within a defined space may include a body of a user and/or a face of a user. These false positive objects may include televisions or displays, pictures or picture frames, mirrors or any other suitable object that may include a body and/or a face of a user (i.e., false positive data). In such instances, the object detection module may be useful in identifying an object with potential false positives and flag or otherwise, provide the object data to the body detection modules (as well as the facial recognition module) to avoid a detection of a body of a user within those objects thereby avoiding false positives. By providing the object data to the body detection module, these objects in an image may be dropped from the image of the scene, specifically marked within the image of the scene, or the like to indicate to the body detection module that the detected object may include data that may trigger a false positive detection of a body and/or a user.

S220 implementing the body detection module may be capable of detecting a body image even based on a partial body image or a full body image within a scene. For instance, if in a captured scene only includes a bottom portion of a body from a belly position of the body down towards feet of the body are viewable, the body detection module may still detect a body from this partial body data within the scene. The body detection module may function to detect any suitable body components (e.g., an arm, a leg, a torso, a hand, a foot, only a head, part of a head, etc.) for identifying a partial body image within a scene.

S220 further includes identifying image frames having a potential body within a scene of the image frames and transmitting the image frames to body extraction module. The body extraction module, as discussed in the description below, may implement one or more image processing techniques to identify and specifically, extract a body from each of the image frames captured from a scene. In some embodiments, the body detection module and the body extraction module may be a single or combined module that performs body detection in an image scene and body extraction of the detected body.

Additionally, in identifying the image frames having a potential body, S220 includes marking or flagging the potential body. The marking or flagging can simply point out a location or provide coordinate location data within an image frame where the body detection module has identified as having a body. Preferably, the body detection module marks or flags the body by providing an outlining indicator that surrounds a silhouette of the potential body in the image frame. S220 may generate a silhouette that may be granular, such that the silhouette precisely outlines or follows a shape a detected body within an image scene. Alternatively, S220 may generate a silhouette that may be course (e.g., a box), such that the silhouette broadly captures the body including areas immediately outside of a shape of the detected body. Additionally, or alternatively, precise coordinate information (e.g., localization data) of the body location within each image frame may be generated and provided as input. The coordinate information may be of the entire body and/or of a periphery (or silhouette) of the body. In this way, augmenting the detected body data with coordinate data of the detected body improves a probability of extracting a body at the body extraction module because less analysis of the image frames will be required to determine a body location. That is, portions of an image frame that does not include a marking or flagging of the potential body and/or a coordinate of the potential body will be dropped from analysis, such that only a limited section of the image frame is considered by the processing modules (e.g., body detection modules, body tracking modules, facial recognition modules, etc.).

It shall be noted that while S220 generally functions to collect image data that may be used to identify a silhouette (edges) or a shape of a human body, S220 in some variations may additionally function to capture other biometric data of a user including joint data, gait data, voice data, and the like. Joint data preferably includes positions and/or locations of each of a user's joints along their body. Thus, an analysis of the one or more image frames captured may also result in an identification of the joints of a body of a user. Consequently, joint data for a detected body may be generated and also, used as input to inform an identity of the user associated with the body. Gait data preferably includes data relating to a person's manner of walking. S220 preferably includes an analysis of a detected body across multiple images frames that enables a determination of a gait associated with the body. Similar to joint data, gait data for a detected body may be generated and used as input to inform an identity of the user associated with the body.

S230, which includes cropping an image of the detected body, functions to receive as input into a body extraction module each of the image frames identified in S220 as having an image of a body (or partial body). S230 analyzes each of the image frames to determine an extractable body or body features and further to determine non-body features within each of the images frames. The non-body features in the image or scene may include objects and circumstances surrounding an identified body image or body feature. Once an extractable body image is identified, S230 functions to extract or crop an image of the body from each image frame and/or drop the non-body portions of the image frames. A new image file may be subsequently generated by S230, which includes only the image of the body from each of the image frames.

Extracting the body image from each of the image frames functions to improve the quality of input provided to subsequent image processing techniques and prediction techniques of method 200. In particular, by extracting the body image, alone, and eliminating extraneous object and surrounding information (i.e., non-body objects or non-body circumstances) reduces the computing power needed to track the body within each image frame because there is less image data to evaluate by the body tracking module and the like.

Additionally, once a body image is extracted from each of the image frames, S230 functions to transmit the extracted body image from each image frame to a body tracking module, a facial detection module, and/or a body movement prediction module. S230, preferably, transmits the extracted body image for each image frame to the facial detection module and the body tracking module, in parallel, such that the facial detection and/or facial recognition processing and the body tracking S260 are performed asynchronously and at a same time thereby enabling efficiency in tracking the body and identifying the user.

S240, which includes transmitting the cropped image of the body to a body tracking module and to a facial detection module, may function to transmit, in parallel, the extracted image of the body to the body tracking module (from either the peripheral cameras or the second moveable camera) and to the facial recognition module for the purpose of simultaneous (parallel) processing. Thus, in some circumstances, even when an identity of the user associated with the body is not readily known, the method 200 may function to track the body and likely provide a generic (but potentially differentiating) identifier, such as user 1. Once a user's identification is determined via the facial recognition module or some other biometric-based identification module, the method may update the user 1 value with the determined name or identity of the user associated with the body.

S240 may function to transmit in a continuous manner image frames having a detected body as the image frames are captured by one or more image capturing devices. Alternatively, S240 may function to transmit the image frames once a threshold number of image frames are met or according to a predetermined transition schedule.

Figure 3:
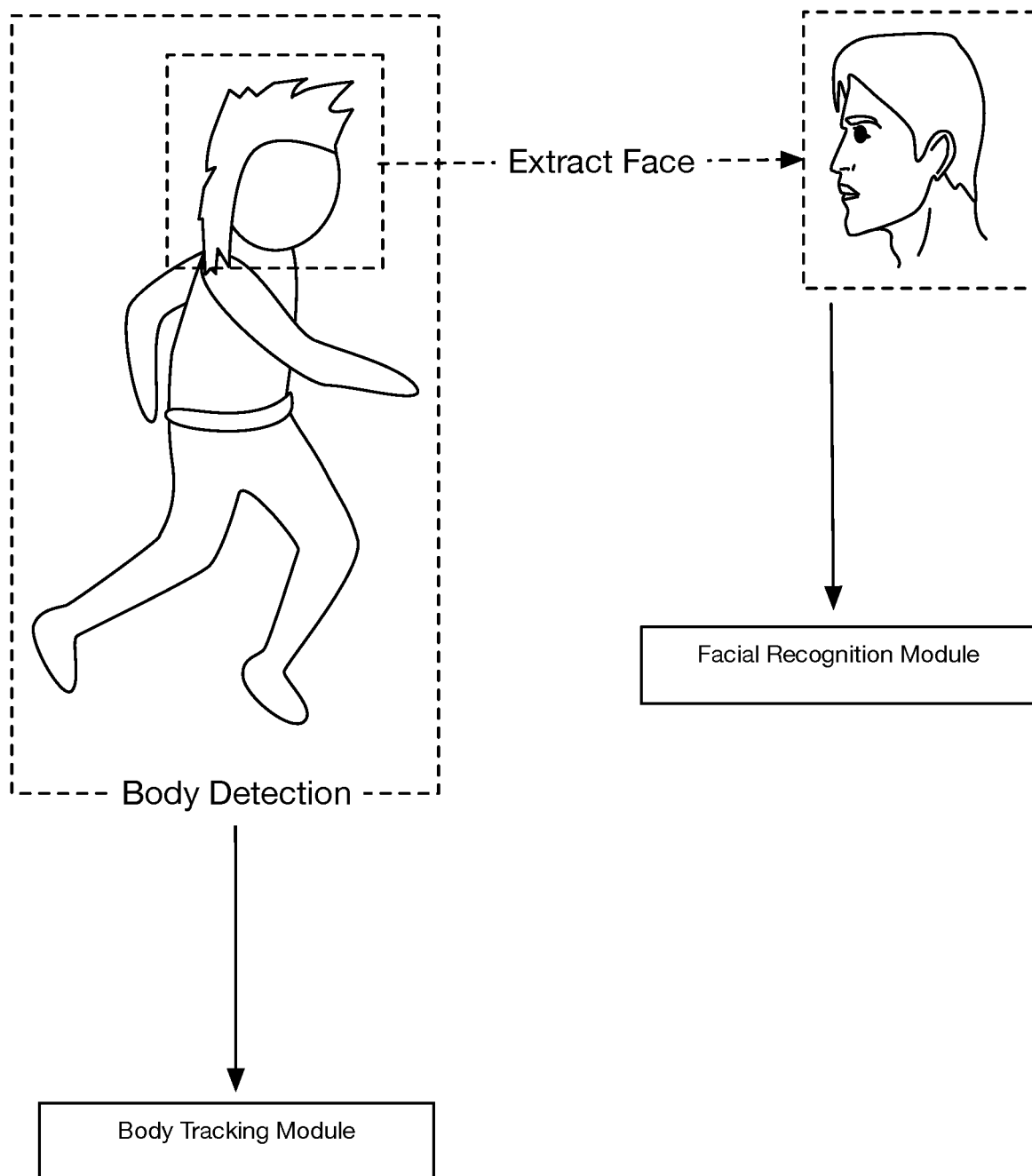
FIG. 3 illustrates a schematic demonstrating body and face detection in accordance with one or more embodiments of the present application.

S250, which includes cropping an image of a head (face) of the body, functions to extract an image of the head (including a face) of the extracted body image from each image frame. That is, in some embodiments, once a body is detected in an image and an image of the body is extracted from an image frame (S230) and using a head or face detection algorithm, S250 analyzes the image of the extracted body to detect a location of a head (or face) of the body. Once a location of the head of the body is determined, S250 may function to localize an extracting process to extract only the portion of the extracted body image that corresponds to the head of the body, as shown in FIG. 3.

Once an image of the head is extracted from each extracted body image frame, S250 may function to transmit a separate image file including the image of the head of the body to a facial recognition module (S270) specifically configured for identifying a user associated with the head. In some embodiments, the facial recognition module implements a facial recognition algorithm to specifically identify a user (e.g., a user's name or other identifier) using the images from the peripheral camera. Additionally, or alternatively, the facial recognition module may compare the image of the head or features of the image of the head to a database that includes stored facial images of potential users and/or facial image features (e.g., eyes, nose, ears, lips, chin, etc.) of potential users.

Accordingly, the facial recognition module may function to determine an identity of a user based on the extracted image of the head based on the images originally captured by the peripheral cameras. However, in some cases, the images from the peripheral camera may not be of sufficient image quality or image resolution to allow the facial recognition module to accurately determine a user's identity from the extracted image of the head. That is, the images captured by the peripheral cameras may have insufficient pixels to match captured images to stored images of users according to a minimal match or facial recognition confidence level. In some embodiments, the minimal match or minimal facial recognition confidence level is based on a minimal quality and/or number of pixels in an extracted facial and/or an extracted body image. In this regard, the facial recognition module may return an indication indicating a facial recognition matching failure (e.g., insufficient pixels in image, etc.) or an indication of no facial match with the image of the head. This indication or the like by the facial recognition module may trigger the generation of instructions to trigger a second camera (image capturing device) of the system having a greater focal length than the peripheral cameras that is capable of capturing an image with greater image resolution (e.g., greater pixels) and thus, capable of providing sufficient image data of the scene where motion is detected to perform at least the facial recognition of the user.

Accordingly, S255, which includes automatically triggering a second moveable camera to capture an image of a face of the body, functions to identify a location of a head of the body in a scene and capture images of the head of the body. That is, instructions to the second moveable camera may include granular instructions to capture images of the head of a body rather than the entire body within a scene. In such embodiments, the second moveable camera may be capable of remote directional and zoom control.

As mentioned above, the initial extracted body image may also include coordinate data that indicates a location of the body within the defined space or within an image scene that may then be passed to the second moveable camera for generating positioning data for the second moveable camera and locating the body in a scene. For instance, the coordinate data may include general coordinates of the body within the space and/or specific coordinates of a component of the body (e.g., coordinates of the head or face of the body). While, in some embodiments, when the body is moving infrequently, moving slowly, or becomes immobile, the coordinate data obtained with the extracted body image may be helpful; however, it may be necessary in other embodiments in which the body moves frequently or changes positions within a scene rapidly that predicted positioning data for the body is provided to the second moveable camera. Thus, according to a calculated state of the body, either actual position data or predicted position data of the body may be provided to the second camera. In such embodiments, a first state of the body may include a state in which the body does not move between image frames or below or at a movement threshold and a second state of the body in which the body moves at or above a movement threshold. Calculating a state of the body preferably includes calculating a speed of movement of the body within the space based on movement of the body within the captured images.

Accordingly, depending on a calculated movement mode (e.g., slow-movement mode or fast-movement mode) of the body throughout the image frames, the second moveable camera may be set to receive either actual body image coordinates or predicted body image coordinates. For instance, in the case of a calculated slow-movement mode, actual body image coordinates may be provided to the second moveable camera to be used as input in generating positioning data. On the other hand, in the circumstance involving a calculated fast-moving mode, predicted body image coordinates may be provided to the second moveable camera to be used as input for determining positioning data.

S260, which includes initiating body tracking and augmentation of body tracking data to a body image frame (or file), functions to receive, as input, the extracted body images and implement a tracking of the movement of the body throughout each of the frames and further, generate assistive data (e.g., tracking data) that may be utilized in one or more additional techniques of method 200.

As mentioned above, the body tracking module functions to track an image of the body throughout each of the images frames. The body tracking module includes functionality to append or associate with each of the image frames including an image of the body, tracking data including coordinate data of the image of the body within the frame or with respect to the defined space. The additional data generated by the body tracking module may include temporal (e.g., time-based, timestamps, etc.) data and other contextual data regarding the circumstances surrounding the body image.

Additionally, or alternatively, S260 may function to use the body tracking module to generate identity inferences for tracking a body within a space even when lapses in the tracking of the body occurs. That is, in some instances, a body that is being tracked may move about disparate locations in space that may include blind spots in which the image capturing devices are not able to capture images of the body, the body moves between spaces in which image capturing devices are not present, or the body moves between spaces in which another system implementing the method 200 begins a body tracking of the body. In such instances, S230 may enable the body tracking module to infer that a body that is being tracked is a same body or user even when there is a lapse based on a determination that the body did not enter or exit a recognized entry or exit of the space. That is, re-confirmation of a user identity may not be required when the body tracking module loses track of the body for a period but is able to confirm that the body did not enter a recognized entry of a space nor exit a recognized exit of the space.

Additionally, or alternatively, S260 may function to operate the body tracking module to periodically and/or actively re-confirm an identity of a user associated with a body that is actively tracked. That is, after a predetermined number of image frames are captured that include a body being tracked, S260 may function to re-confirm an identity by transmitting images of the body being tracked to one or more of the recognition modules to validate that a current user identity of the body being tracked by the body tracking module is the same user. In this way, accuracy of the body tracking and associated user identity may be further ensured even if a user travels between a number of regions of a space or between spaces (that include a number of disparate systems) in which visibility of the user's motion is degraded or obstructed across one or more points in time during a continuous (or discontinuous) tracking of the user.

Figure 4:
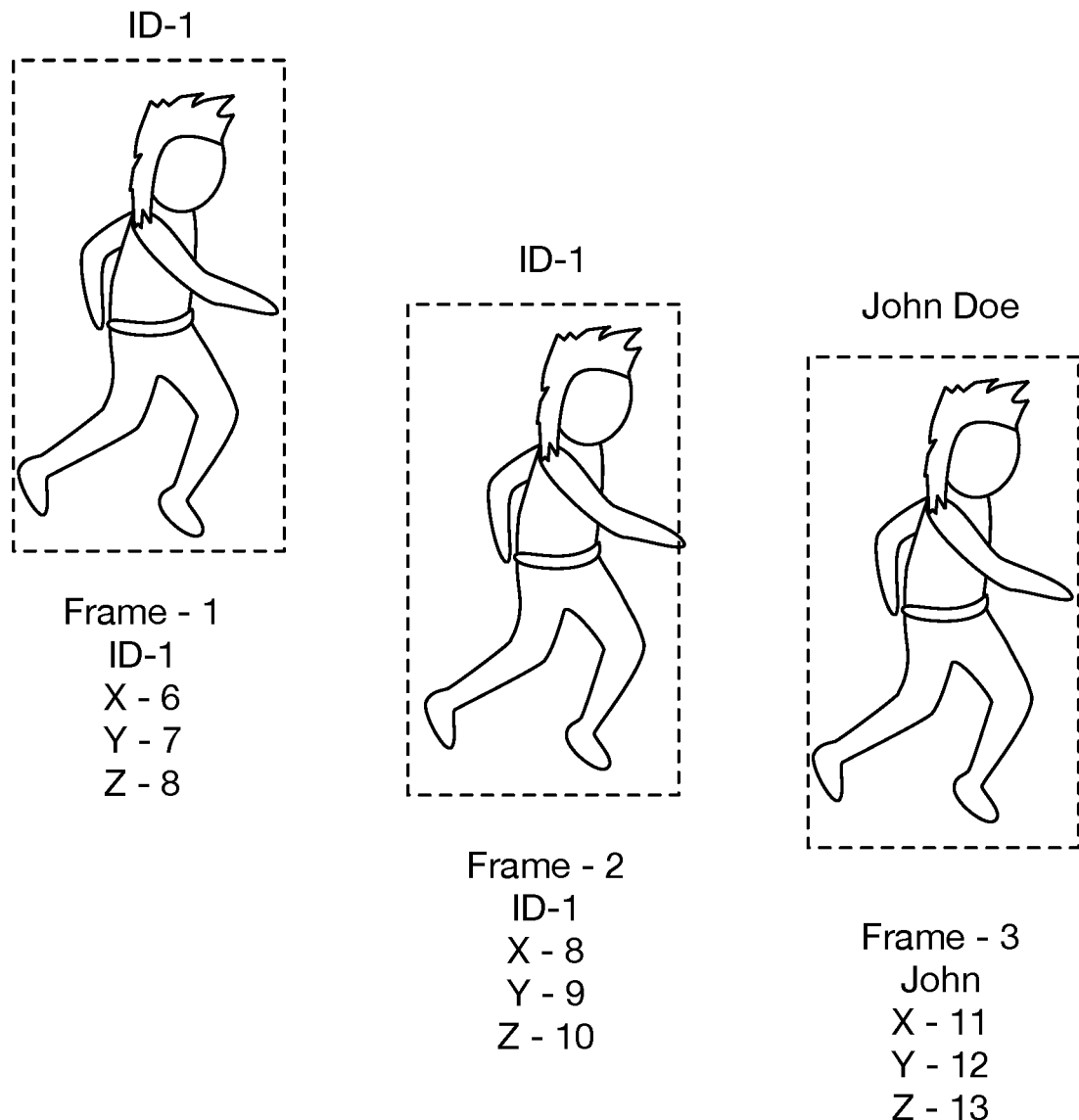
FIG. 4 illustrates another schematic demonstrating body tracking in accordance with one or more embodiments of the present application.

Additionally, or alternatively, S260 may include generating an ephemeral identifier for each body identified and being tracked in an image frame, as shown in FIG. 4. For instance, if the body tracking module is tracking two bodies, the body tracking module may associate with a first body the identifier, ID-1, and may associate with the second body the identifier, ID-2. Thus, for each frame at time, $t_n$ (where n>0, n is an integer), the body tracking module associated coordinate data and an identifier for each body image in a frame. An example frame may be described as follows: Frame 1: Body Image, ID-1 at [X1, Y1, Z1], Time1; Frame 2: Body Image, ID-1 at [X2, Y2, Z2], Time2 . . . . If a second body image was in a same scene and frame as a first body image, the second body image would be described as Body Image, ID-2 having its own coordinate information.

Additionally, or alternatively, in some embodiments, the body tracking module is initialized with localization data to determine the position of a system implementing method 200 relative to other features and objects within a room. Thus, in operation, S260 may function to identify coordinate information (i.e., localization data) of the body image with respect to areas of the defined space, with respect to a location of the system implementing method 200, or with respect to a position of the body image within an image frame. Any variation or combination of this position and/or tracking data may be associated with each image frame.

Additionally, the captured image data and/or the body tracking data may be transmitted to a body movement prediction module for predicting positioning data of a body image within one or more future image frames.

Optionally, S265, which includes predicting a movement of the body within the space, preferably functions to implement a body movement prediction module to predict a location of the body image within the same image scene or within another image scene. Accordingly, in some embodiments, S230 may additionally or alternatively provide the captured image data from a scene in the space to a body movement prediction module. S235, preferably, comprises a body movement prediction algorithm (or any suitable predictive algorithm including predictive machine learning models) that analyzes one or more historical image frames to predict a trajectory of the body. For instance, the body movement prediction module may receive, as input (e.g., sample data) ten historical image frames having a body identified therein to predict the next five image frames of a same scene and/or the next five image frames of another scene having an image of the body present within the frames.

S265 may also function to predict granular coordinate information for each of the predicted frames. For instance, S265 may include predicting a future X, Y, and Z coordinate within the space for each of the predicted image frames. Additionally, or alternatively, S235 may transmit the predicted image frames together with the predicted coordinate data to one or more additional processing of the method 200. As an example, the predicted image frames and the predicted coordinate data may be transmitted to a PTZ camera or the like to be used as input to generate advanced movement instructions (e.g., moving the camera to the predicted locations) for performing one or more movements of the PTZ camera ahead of the detected body moving into a field-of-view of the PTZ camera. That is, the PTZ camera or image capturing device may function to anticipate a future location of the body and position its field-of-view in the future location in advance of the body arriving to the future location.

S270, which includes identifying an identity of a user using the face of the body, functions to implement a facial recognition module that uses, as input, an image of the head or face of the body captured from the second moveable camera to determine an identity of a user associated with the image of the face or image of the head.

Accordingly, S270 may pass the image of the head or face of the body as input into a facial recognition module executing a facial recognition algorithm to determine the user's identity. Additionally, or alternatively, the facial recognition module may compare the image of the face or head or features thereof to an image/user ID database until a match is determined. Preferably, the image/user ID database is a local database residing on a system implementing method 200.

Optionally, or additionally, S275, which includes implementing a multi-tiered validation of a calculated user identity, functions to enhance and/or validate the identification of a user associated with the body.

In one implementation, S275 may function to use additional and/or any suitable biometric data including voice data, joint data and/or gait data derived from the one or more images of the body and/or acoustic data to enhance user identification that may typically be performed at the facial recognition module. In particular, S275 may function to implement a gait recognition module and/or a body joint recognition module that may be used to identify a user according to their gait and/or body joints, respectively.

In some embodiments, the user identification results of one or both of the joint recognition module and the gait recognition module may be used in lieu of the user identification results of the facial recognition module.

In some embodiments, the joint data and the gait data may be used as a first tier and a second tier for validating a user identification determined according to the method 200. For instance, if the facial recognition module provides a user identification having a low confidence, the results of the gait recognition module and/or the joint recognition module may be used to validate or invalidate the user identification. Accordingly, in some embodiments, use of a higher resolution image capturing device may not be required if gait data and/or joint data are captured and used for validation.

Similarly, gait data and/or joint data may be used to improve a speed and/or efficiency in determining user identification (e.g., from a facial recognition module), which is typically based solely on results of a facial recognition module. For instance, the gait recognition module and/or the joint recognition module may be implemented in parallel with the processing of the facial recognition module, such that, even with partial completion of the user identification processes of any of the gait, joint, or facial recognition modules, a high confidence user identification may be provided for a given body. For instance, if the joint, gait, and facial recognition modules are run in parallel, a first of the modules may process the image data to 50%, a second of the modules at 55%, and a third of the modules at 60% process completion. However, if the user identification at each of the modules is consistent, even at partial completion of the user identification process, S255 may output a user identification of a user associated with a body that matches the same or consistent user identification at each of the modules. In this way, the user identification process of a body may be expedited even with partial process.

S280, which includes identifying an identity of a user using the face of the body S270 and updating the tracking data with the identity of the user, functions to, in response to determining an identity of a user associated with the head or face of the body, transmit to the body tracking module the determined identity of the user so that the body tracking module may update the body tracking frames with specific user identification (ID) data (e.g., a user's name, a recognized user identifier, or the like).

Once a user's ID is determined by the facial recognition module and provided to the body tracking module, the facial recognition processing at either or both of S250 and S270 may be stopped or made idle, in some embodiments. Thus, the method 200 also ceases to transmit the extracted head or face images to the facial recognition module; however, the method 200 continues to extract body images and provide the same to the body tracking module.

The body tracking module may additionally function to update its tracking information to positively include the user's identity associated with the body image. Keeping with the prior example above, the frame data at the body tracking module may be represented, as follows: Frame 1: Body Image, John Does at [X1, Y1, Z1], Time1; Frame 2: Body Image, John Doe at [X2, Y2, Z2], Time2.

Accordingly, once a specific user identity is recognized and associated with the body image tracked by the method 200, applications and functionality associated with the system may be implemented. For instance, prestored user preferences with respect to any number of applications accessible and/or stored on a system implementing the method 200 that are associated with an identified user identity may be activated.

Additionally, or alternatively, S280 may function to periodically re-validate or re-confirm an identity of a previously identified user. In some embodiments, S280 re-initiates facial extraction and facial recognition of a previously identified user that is being tracked in a space to ensure accuracy of an ongoing body tracking and user identification.

Accordingly, S280 may function to re-validate or re-confirm an identity of a previously identified user based on one or more of a passage of time (e.g., every 15 minutes, etc.), a detection of an event (e.g., an entry of a new body into the monitored space), an increased movement of a user or increased movement of multiple users in a space, a movement of a user between disparate spaces, upon an entry or exit of a tracked user in a monitored space, and the like. It shall be noted that re-validation and/or re-confirmation of identity may be based on any suitable event or predetermined schedule.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor and/or the controller. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
    capturing one or more images of a scene by using one or more of a plurality of peripheral image capturing devices;
    detecting a body of a person within at least one of the one or more images of the scene;
    generating body location data by tracking location of the body within a space by using the one or more captured images;
    determining that a resolution of an image of a head of the body does not satisfy a minimal facial recognition threshold; and
    in response to determining that the resolution does not satisfy the minimum facial recognition threshold:
        controlling a moveable high-resolution image capturing device to capture a high-resolution image of a face of the body by using the generated body location data, and
        determining an identity of the body by performing a facial recognition process using the high-resolution image of the face of the body.

2. The method of claim 1, further comprising, in response to determining the identity of the body, augmenting image frames of the captured one or more images that include the body within the scene with identity data based on the determined identity of the body.

3. The method of claim 2, wherein controlling a moveable high-resolution image capturing device to capture a high-resolution image of a face of the body by using the generated body location data comprises:
    generating movement instructions for moving the moveable high-resolution image capturing device to a position of the body by using the generated body location data;
    controlling movement of the moveable high-resolution image capturing device in accordance with the generated movement instructions; and
    controlling the moveable high-resolution image capturing device to capture the high-resolution image in response to movement of the moveable high-resolution image capturing device to the position of the body.

4. The method of claim 3, wherein controlling the moveable high-resolution image capturing device to capture the high-resolution image in response to movement of the moveable high-resolution image capturing device to the position of the body comprises:
    controlling the moveable high-resolution image capturing device to actuate a zoom function, and controlling the moveable high-resolution image capturing device to capture the high-resolution image of the face after actuating the zoom function.

5. The method of claim 4, wherein the generated body location data identifies coordinates for the body within the space.

6. The method of claim 5,
    wherein generating the body location data comprises:
        calculating a speed of movement of the body within the space based on movement of the body within the captured images;
        classifying the speed of the movement of the body as one of a slow-movement mode or a fast-movement mode;
        in response to classifying the speed as a slow-movement mode, determining actual coordinates for the body;
        in response to classifying the speed as a fast-movement mode, determining predicted coordinates for the body,
    wherein the generated body location data includes at least one of actual coordinates for the body and predicted coordinates for the body.

7. The method of claim 6, wherein determining predicted coordinates for the body comprises: predicting movement of the body within the space based on the captured images.

8. The method of claim 7, wherein the coordinates for the body include coordinates for the head within the space.

9. The method of claim 7, wherein the coordinates for the body include coordinates for the face within the space.

10. The method of claim 6, wherein the moveable high-resolution image capturing device has a focal length that is greater than the focal lengths of the plurality of peripheral image capturing devices.

11. A system comprising:
    a plurality of peripheral image capturing devices arranged about a body of the system, wherein the plurality of image capturing devices capture one or more images of a scene within a space;
    a moveable high-resolution image capturing device;
    a controller; and
    a non-volatile memory that comprises instructions, that when executed by the controller, control the controller to:
        capture one or more images of a scene by using one or more of the plurality of peripheral image capturing devices,
        detect a body of a person within at least one of the one or more images of the scene,
        generate body location data by tracking location of the body within a space by using the one or more captured images,
        determine that a resolution of an image of a head of the body does not satisfy a minimal facial recognition threshold, and
        in response to determining that the resolution does not satisfy the minimum facial recognition threshold:
            control the moveable high-resolution image capturing device to capture a high-resolution image of a face of the body by using the generated body location data, and
            determine an identity of the body by performing a facial recognition process using the high-resolution image of the face of the body.

12. The system of claim 11, further comprising, in response to determining the identity of the body, augmenting image frames of the captured one or more images that include the body within the scene with identity data based on the determined identity of the body.

13. The system of claim 12, wherein controlling the moveable high-resolution image capturing device to capture a high-resolution image of a face of the body by using the generated body location data comprises:
- generating movement instructions for moving the moveable high-resolution image capturing device to a position of the body by using the generated body location data;
- controlling movement of the moveable high-resolution image capturing device in accordance with the generated movement instructions; and
- controlling the moveable high-resolution image capturing device to capture the high-resolution image in response to movement of the moveable high-resolution image capturing device to the position of the body.

14. The system of claim 13, wherein controlling the moveable high-resolution image capturing device to capture the high-resolution image in response to movement of the moveable high-resolution image capturing device to the position of the body comprises:
- controlling the moveable high-resolution image capturing device to actuate a zoom function, and controlling the moveable high-resolution image capturing device to capture the high-resolution image of the face after actuating the zoom function.

15. The system of claim 14, wherein the generated body location data identifies coordinates for the body within the space.

16. The system of claim 15, wherein generating the body location data comprises:
- calculating a speed of movement of the body within the space based on movement of the body within the captured images;
- classifying the speed of the movement of the body as one of a slow-movement mode or a fast-movement mode;
- in response to classifying the speed as a slow-movement mode, determining actual coordinates for the body;
- in response to classifying the speed as a fast-movement mode, determining predicted coordinates for the body, wherein the generated body location data includes at least one of actual coordinates for the body and predicted coordinates for the body.

17. The system of claim 16, wherein determining predicted coordinates for the body comprises: predicting movement of the body within the space based on the captured images.

18. The system of claim 17, wherein the coordinates for the body include coordinates for the head within the space.

19. The system of claim 17, wherein the coordinates for the body include coordinates for the face within the space.

20. The system of claim 16, wherein the moveable high-resolution image capturing device has a focal length that is greater than the focal lengths of the plurality of peripheral image capturing devices.

* * * * *